United States Patent
Kayiran et al.

(10) Patent No.: US 10,303,602 B2
(45) Date of Patent: May 28, 2019

(54) PREEMPTIVE CACHE MANAGEMENT POLICIES FOR PROCESSING UNITS

(71) Applicant: Advanced Micro Devices, Inc., Sunnyvale, CA (US)

(72) Inventors: Onur Kayiran, Sunnyvale, CA (US); Gabriel H. Loh, Bellevue, WA (US); Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/475,435

(22) Filed: Mar. 31, 2017

(65) Prior Publication Data
US 2018/0285264 A1  Oct. 4, 2018

(51) Int. Cl.
G06F 12/08       (2016.01)
G06F 12/0806  (2016.01)
G06F 12/0804  (2016.01)
G06F 12/0817  (2016.01)

(52) U.S. Cl.
CPC ...... G06F 12/0806 (2013.01); G06F 12/0804 (2013.01); G06F 12/0817 (2013.01); *G06F 2212/1024* (2013.01); *G06F 2212/1048* (2013.01); *G06F 2212/502* (2013.01)

(58) Field of Classification Search
USPC ......................................................... 711/143
See application file for complete search history.

(56) References Cited

U.S. PATENT DOCUMENTS

| | | | | |
|---|---|---|---|---|
| 2006/0288173 A1* | 12/2006 | Shen | ................... | G06F 12/0833 711/141 |
| 2008/0109606 A1* | 5/2008 | Lataille | ............... | G06F 12/0859 711/133 |
| 2010/0235576 A1* | 9/2010 | Guthrie | ............... | G06F 12/0811 711/122 |
| 2010/0281221 A1* | 11/2010 | Cantin | ................ | G06F 12/0813 711/132 |
| 2012/0066474 A1* | 3/2012 | Funk | ................... | G06F 12/1027 711/207 |
| 2013/0254488 A1* | 9/2013 | Kaxiras | ............... | G06F 12/0815 711/130 |
| 2013/0297906 A1* | 11/2013 | Loh | ..................... | G06F 13/1642 711/167 |
| 2014/0149703 A1* | 5/2014 | Jones, III | ............ | G06F 12/1441 711/163 |

(Continued)

OTHER PUBLICATIONS

Li, Enyou, et al., "Data Cache Parameter Measurements." Proceedings of the International Conference on Computer Design: VLSI in Computer and Processors, Oct. 5-7, 1998, 8 pages.

*Primary Examiner* — Mano Padmanabhan
*Assistant Examiner* — Jean C Edouard (57) ABSTRACT

A processing system includes at least one central processing unit (CPU) core, at least one graphics processing unit (GPU) core, a main memory, and a coherence directory for maintaining cache coherence. The at least one CPU core receives a CPU cache flush command to flush cache lines stored in cache memory of the at least one CPU core prior to launching a GPU kernel. The coherence directory transfers data associated with a memory access request by the at least one GPU core from the main memory without issuing coherence probes to caches of the at least one CPU core.

19 Claims, 4 Drawing Sheets

(56) References Cited

U.S. PATENT DOCUMENTS

| | | | |
|---|---|---|---|
| 2014/0156932 A1* | 6/2014 | Dundas | G06F 12/0862 711/122 |
| 2014/0164711 A1* | 6/2014 | Loh | G06F 12/0862 711/136 |
| 2014/0173211 A1* | 6/2014 | Loh | G06F 12/0842 711/129 |
| 2014/0181413 A1* | 6/2014 | Manne | G06F 12/0891 711/135 |
| 2014/0181414 A1* | 6/2014 | Eckert | G06F 12/0808 711/135 |
| 2014/0181417 A1* | 6/2014 | Loh | G06F 12/0828 711/141 |
| 2015/0019823 A1* | 1/2015 | Wang | G06F 12/0891 711/136 |
| 2015/0067266 A1* | 3/2015 | Jafri | G06F 12/0804 711/136 |

* cited by examiner

PREEMPTIVE CACHE MANAGEMENT POLICIES FOR PROCESSING UNITS

GOVERNMENT LICENSE RIGHTS

This invention was made with government support under Prime Contract Number DE-AC52-07NA27344, Subcontract No. B609201 awarded by the Department of Energy (DOE). The Government has certain rights in this invention.

BACKGROUND

Description of the Related Art

A computing system may include heterogeneous processors, such as central processing units (CPUs) and graphics processing units (GPUs), that are physically integrated on a single chip. The heterogeneous processors may be also logically connected via a shared memory through support for a unified (i.e., shared) memory address space. Maintaining cache coherency between caches associated with the heterogeneous processors is an important aspect of such systems. To avoid processing errors, cache coherence protocols are used to maintain a consistent, or "coherent," view of data shared and cached at different processors.

Maintaining cache coherency between caches in heterogeneous CPU-GPU systems incurs a cost in terms of performance or latency due to the number of coherence messages, such as cache probes, that need to be transmitted between processors. For example, GPU operations are typically memory intensive and memory transactions initiated by a GPU might require transmitting corresponding coherence messages to CPU caches to maintain cache coherency. Thus, memory transactions might incur a latency cost due to the time required for sending coherence messages and awaiting response from other caches, and such latency costs can impact processing efficiency. Further, a high number of coherence messages might cause performance bottlenecks in the communication fabric of the system. For example, a high number of coherence messages increases the execution time of GPU kernels when cache lines that the GPU accesses are present in the CPU caches.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In heterogeneous CPU-GPU systems with a unified memory address space, coherence messages are transmitted between CPUs and GPUs when cache lines that are accessed by the GPU accesses are present in the CPUs' caches. A high level of coherence-related traffic decreases system performance by forcing GPU kernels operating at the GPU to wait on completion of coherence messaging for its execution. Such inefficiencies can be exacerbated in heterogeneous systems where CPU and GPU cores are positioned on separate dies with longer communication latencies between the CPUs and GPUs. FIGS. 1-4 illustrate techniques for improving system performance by reducing coherence traffic in heterogeneous systems. In some embodiments, coherence traffic is reduced during the execution of a GPU kernel by flushing some or all of CPU caches and/or switching from write back to write-through and no-write-allocate policies before the launch of a GPU kernel.

For example, in some embodiments, CPU caches are flushed before launching the GPU kernel, thereby causing data requested by the GPU to be not present in the CPU caches. If the communication fabric is congested, latency for a GPU to access information stored in the main memory might be lower than a latency for transmitting coherence messages and accessing information stored in CPU caches, flushing the CPU cache before launching the GPU kernel can improve the efficiency of execution of the kernel.

In other embodiments, coherence traffic is reduced by switching CPU caches' write policy from write-back to write through such that any write hits to cache lines are directly propagated to the main memory. Switching to a write-through policy allows the CPU caches to hold clean data (i.e., data that is consistent with data stored at main memory) during execution of GPU kernels. This in turn allows the GPU fast access to cache lines for read purposes without probing CPU caches with coherence messages to determine coherence status of other cached lines for the requested cache-line address.

Figure 1:
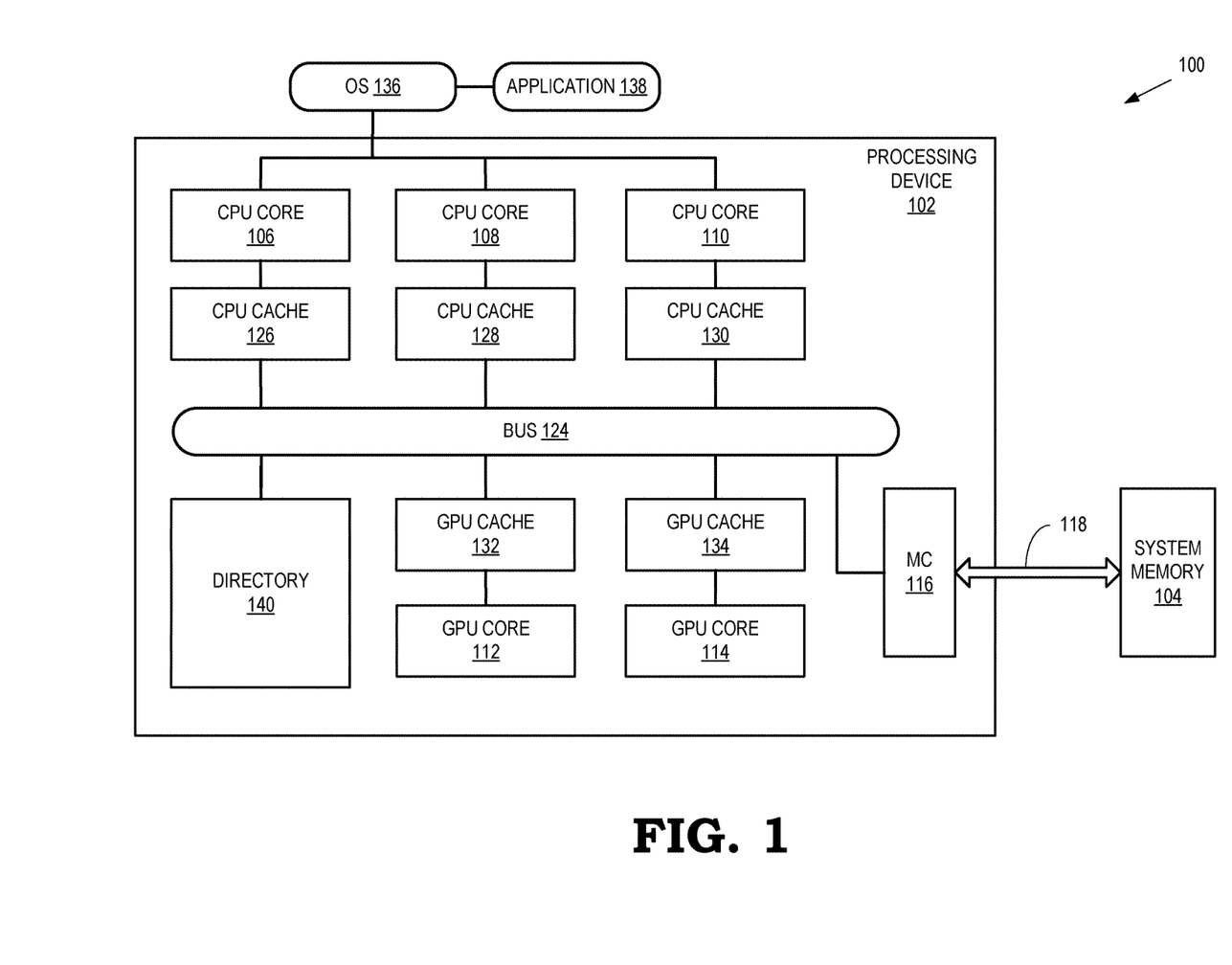
FIG. 1 is a block diagram of a processing system including heterogeneous processors according to some embodiments.

FIG. 1 is a block diagram of a processing system 100 including heterogeneous processors according to some embodiments. The processing system 100 includes a processing device 102 that is connected to a system memory 104, such as a dynamic random access memory (DRAM). The processing device 102 includes a plurality of compute units 106, 108, 110, 112, 114 (collectively referred to as the "compute units 106-114") such as central processing unit (CPU) cores 106, 108, 110 and graphics processing unit (GPU) cores 112, 114. Each of the compute units 106-114 includes one or more processor cores that concurrently process different instructions. The compute units 106-114 also include one or more resources that are shared by the processor cores, such as caches, arithmetic logic units, floating-point units, branch prediction logic, memory or bus interfaces, and the like.

The processing device 102 may be implemented as a single integrated circuit, or as a combination of multiple integrated circuits. For example, the processing device 102 can be fabricated as a system-on-a-chip (SoC) such as an accelerated processing unit (APU) or accelerated processing device (APD) that is formed on a substrate. To illustrate, the processing device 102 (and the functional units formed thereon) may form part of one semiconductor die, while the system memory 104 forms part of a different semiconductor die. In other embodiments, CPU cores and GPU cores may be formed on different dies.

The processing device 102 is associated with corresponding memory elements, which may be internal to (e.g., implemented on) the processing device 102 or external to the processing device 102 (e.g., system memory 104). For example, the processing device 102 is connected to the external system memory 104. The processing device 102 includes a memory controller (MC) 116 that coordinates the flow of data between the processing device 102 and the system memory 104 over a memory interface 118. The memory controller 116 includes logic used to control reading information from the system memory 104 and writing information to the system memory 104. In other embodiments, the processing device 102 is associated with other different types of internal or external memory elements.

The compute units 106-114 communicate with each other, with the memory controller 116, or with other entities in the processing system 100 using a bus 124. For example, the compute units 106-114 can include a physical layer interface or bus interface for asserting signals onto the bus 124 and receiving signals from the bus 124 that are addressed to the corresponding compute unit 106-114. Some embodiments of the processing device 102 also include one or more interface blocks or bridges such as a northbridge or a southbridge for facilitating communication between entities in the processing device 102. In some embodiments, the bus 124 comprises a coherent data fabric that interconnects the compute units 106-114.

The processing device 102 includes one or more levels of cache associated with each of the compute units 106-114. Caches 126, 128, 130, 132, 134 (i.e., CPU caches 126, 128, 130 and GPU caches 132, 134; collectively referred to herein as "the caches 126-134") are used to store (i.e., cache) copies of information stored in the memory 104. Memory transactions for the CPU or GPU cores are then satisfied using the cached copy of the information instead of performing the memory transaction directly on the information stored in the memory 104. The blocks used to represent the caches 126-134 may represent a single cache or a plurality of caches such as a cache hierarchy. For example, in one embodiment, the cache 126 represents a cache hierarchy including multiple cache levels such as an L1 cache, an L2 cache, or an L3 cache. In at least one embodiment, each of the caches 126-134 includes a set of entries, each entry storing an associated unit of data referred to as a cache line.

The processing device 102 executes an operating system (OS) 136. Although a single instance of the OS 136 is shown in FIG. 1, some embodiments of the processing device 102 execute multiple instantiations of the operating system or one or more applications. The processing device 102 also executes an application 138 that generates work in the processing device 102. The processing device 102 further includes a coherence directory 140 to maintain memory coherence among the caches 126-134. Compute units including the CPU cores 106, 108, 110 and the GPU cores 112, 114 access information in the memory 104. Thus, memory transactions occur between the compute units and memories of the processing device 102 or between the compute units and associated caches of different compute units.

The coherence directory 140 is configured to receive coherency probes associated with memory access requests for data from one of the compute units 106-114 and search the internal structure to determine if one or more of the cache entries stores a cache line associated with the memory address targeted by a memory access requested. The coherence directory 140 may be implemented as a cache, array, table, latches, flops, or other storage configuration so as to include entries hierarchically arranged as a plurality of "banks", a plurality of indices, and a plurality of ways. That is, each entry in the coherence directory 140 corresponds to a particular bank, index and way combination. Each entry in the coherence directory 140 tracks information for a corresponding cache line that may be present in one or more of the caches 126-134. The information stored at an entry in the coherence directory 140 for the corresponding cache line includes, for example, the physical address (or portion thereof) of the cache line as well as state of the cache line at the caches 126-134. Each bank may contain a plurality of indices and ways and represent the entries used to track the cache lines that may be present in one or more of the caches 126-134.

The coherence directory 140 responds to cache probes generated by the caches 126-134. In particular, in one embodiment, the caches 126-134 include controllers (not shown) that are configured to implement a memory coherency protocol (also referred to herein as a "coherency protocol"). Each cache line is associated with corresponding coherence information, as governed by the coherency protocol, to indicate the coherency state of the cache line, as well as how the cache line may be handled under the rules of the coherency protocol. For example, the coherency protocol may establish coherency states such as "modified" indicating that the cache line has been modified, relative to its state at the system memory 104, at the corresponding cache, "exclusive" indicating that the corresponding cache line cannot be modified at caches associated with other processor cores, and "shared" indicating that the cache line is shared by multiple caches associated with other processor cores and therefore should not be modified.

For specified events, as defined by the particular coherency protocol implemented by the processing device 102, a cache of the processing device 102 issues a cache probe to identify the coherency status of a given cache line at other caches. For example, prior to changing the coherency status of a cache line from shared to exclusive, a cache issues a cache probe to identify whether the cache line is stored at any other cache and, if so, the coherency status of the cache line at the caches that store the cache line. Based on responses to the probe, the cache that issued the probe takes appropriate action, as required under the rules of the coherency protocol. For example, if no other caches store the cache line, the cache changes the state of the cache line from "shared" to "exclusive."

As indicated above, the coherence directory 140 stores entries indicating some of the cache lines stored at each of the caches 126-134 and the memory 104 of the processing device 102. In response to a cache probe, the coherence directory 140 is accessed to determine whether any of the caches 126-134 of the processing device 102 stores the cache line and, if so, its coherence information. Based on the information stored at the coherence directory, the corresponding compute unit provides a response to the cache probe.

If the requested cache line is not found in the cache associated with the requesting compute unit, the associated cache issues a coherence probe which accesses the coherence directory 140 to determine whether any of the other caches of the processing device 102 stores the cache line and, if so, its coherence information. The coherence directory 140 generates a response to the cache probe indicating if any of the caches 126-134 stores a copy of the data requested by the memory access request and its coherence status. If the requested cache line is found in one of the caches 126-134, the coherence directory 140 satisfies the memory access request by, in the case of a read operation, providing the requested cache line from the cache with the most up-to-date copy or from the system memory 104 if the cached lines are clean to the requesting compute unit. In the case of a write operation, the coherence directory 140 issues invalidation requests to all cached copies of the requested address and provides the most up-to-date copy of the data associated with the requested address to the requesting compute unit, which then stores the write data in the cache corresponding to the requesting compute unit. Thus, as described above, the memory access request traverses the memory hierarchy until the requested data is found. The requested data is then transferred to the cache corresponding to the compute unit from which the memory access request originated, and the memory access request is satisfied at the cache. This transfer of data to the cache is referred to herein as "filling" a cache miss.

In some embodiments, in response to a request from one of the GPU cores 112, 114 for information located in the system memory 104, the GPU core attempts to find the requested information in the caches 126-134. For example, a request for a cache line by GPU core 112 is forwarded to the coherence directory 140. The coherence directory 140 sends a poll to a CPU directory (not shown), which probes the CPU caches 126-130. For a cache hit, the CPU core having a cached copy of the requested cache line responds to the probe with data and transfers the requested data to the cache of the requesting GPU core (i.e., GPU cache 132 of GPU core 112). After the GPU core 112 receives the cache line, the directory state of the cache line is updated in coherence directory 140 and the CPU directory (not shown).

GPU cores 112, 114 often perform memory-intensive operations that generate a lot of memory traffic. Maintaining cache coherence requires frequent communication of coherence messages between the GPU caches 132, 134 and the CPU caches 126-130. Coherence messages fall into one of at least two general types: a coherence probe that seeks the coherence state of data associated with a particular memory location, and a probe response that indicates the coherence state, transfers data in response to a probe, or provides other information in response to a coherence probe. To illustrate via an example, the coherency directory monitors memory access requests issued by the GPU cores 112, 114. In response to a cache miss in the cache corresponding to the requesting GPU core 112 (i.e., GPU cache 132), the coherence directory 140 issues a coherence probe to each of the CPU caches 126, 128, 130 and GPU cache 134 requesting the coherency state for the requested data at the caches. In another example embodiment, the coherency directory 140 maintains coherence states of cached lines internally such that the coherence directory 140 contains information whether requested data is cached without sending coherence probes. However, if one of the CPU caches 126-130 contains a more up-to-date copy of the requested data, the coherence directory 140 issues a request to forward the data to a requesting compute unit and updates the directory information.

The CPU caches 126, 128, 130 and GPU caches 132, 134 receive the coherence probes and identify which (if any) of their caches stores the data, and identify the coherence state of each cache location that stores the data. The CPU caches 126, 128, 130 and GPU caches 132, 134 communicate the coherence states for the cache locations that store the data, together with any other responsive information. In a conventional processor, each probe response would be communicated via the bus 124 back to the coherence directory 140 that generated the coherency probe. In a system with a large number of compute units, a large number of coherence-related messages can be generated, thereby consuming a large amount of the bandwidth of the bus 124 and negatively impacting the performance or latency of the processing system 100. The processing system 100 therefore implements cache management policies for the processing device 102 that reduces coherence traffic between the GPU caches 132, 134 and the CPU caches 126-130.

As discussed further herein, a latency for a GPU core to access information stored in one of the GPU caches 132, 134 is lower than a latency for accessing information stored in one of the CPU caches 126-130. Accordingly, to reduce memory access latency for the GPU core, in one embodiment, the CPU cores 106, 108, 110 flush the CPU caches 126-130 prior to the launching of a GPU kernel. Flushing the CPU caches 126-130 prevents the GPU caches 132, 134 from frequently sending coherence messages to the CPU caches 126-130. For example, flushing of the CPU caches 126-130 causes the state of the cache lines at the CPU caches 126-130 to be updated in coherence directory 140. Accordingly, the coherence directory 140 informs any subsequent memory access requests from the GPU cores 112, 114 that requested data is not cached in CPU caches 126-130 and prevents cache probes from being sent to CPU caches 126-130. Therefore, the request is satisfied by other GPU caches that are not associated with the requesting GPU core or the system memory 104, and the communication-related congestion near the CPU caches 126-130 is reduced.

In another embodiment, the CPU cores 106, 108, 110 switch the write policy of the CPU caches 126-130 from write-back to write-through and vice versa before and after GPU execution. Similarly, the write allocation policy of the CPU caches 126-130 is changed to no-write-allocate from write-allocate and vice versa before and after GPU execution. This allows the CPU caches 126-130 to hold clean data and provides faster access for read purposes during execution of GPU kernels. Any write hits to a cache line in a CPU cache during the write-through mode will directly be propagated to the system memory 104, which can reduce coherence traffic between the GPU caches 132, 134 and the CPU caches 126-130 during execution of GPU kernels. Any write misses in a CPU cache during the no-write-allocate mode will not cause the cache line to be brought back to the cache, thereby potentially further reducing the amount of coherence related traffic.

Figure 2:
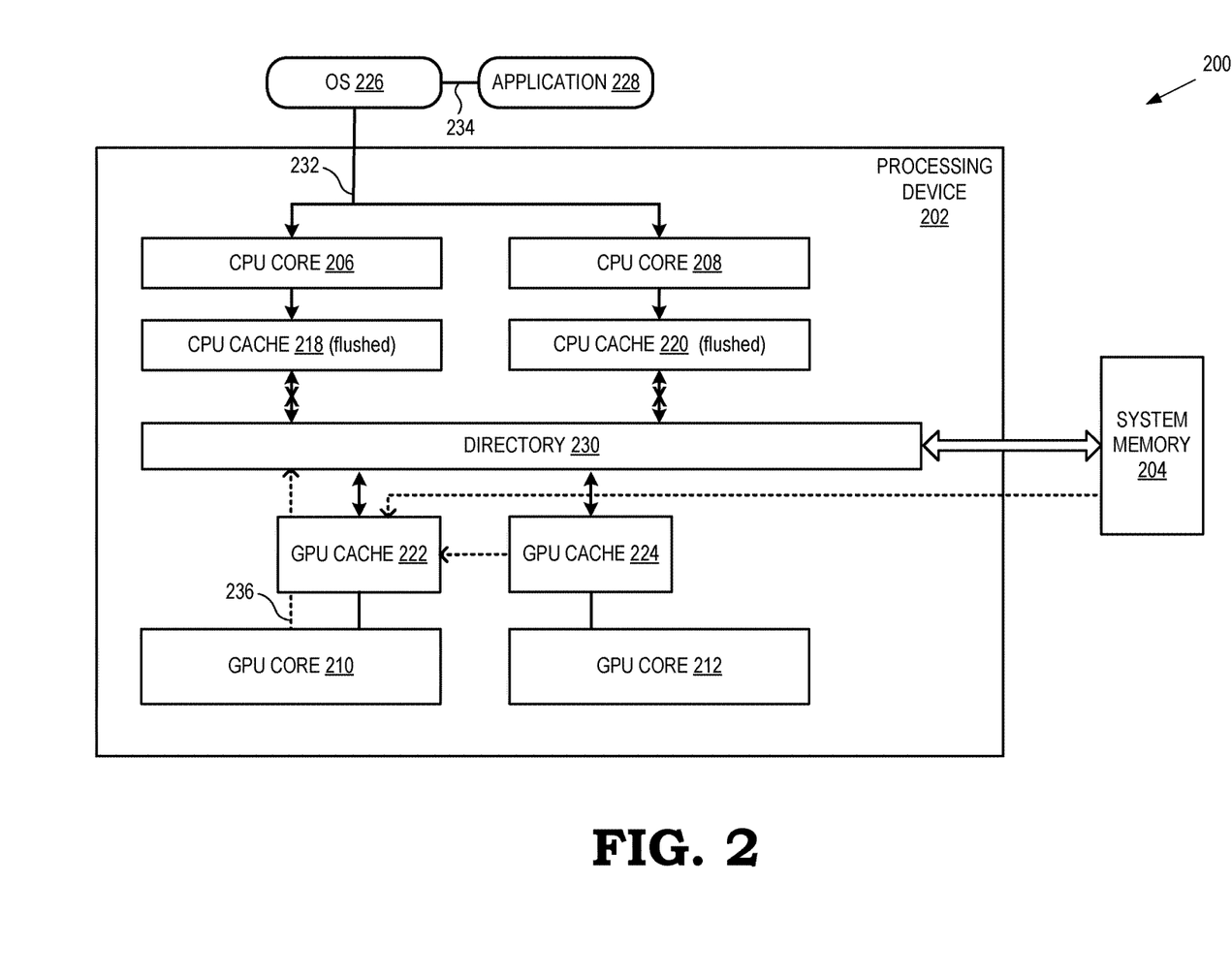
FIG. 2 is a block diagram of a portion of the processing system of FIG. 1 according to some embodiments.

FIG. 2 is a block diagram of a portion 200 of a processing system according to some embodiments. The portion 200 is implemented in some embodiments of the processing system 100 shown in FIG. 1. The portion 200 includes a processing device 202, such as the processing device 102 of FIG. 1, that is connected to a system memory 204. The processing device 202 includes a plurality of compute units 206, 208, 210, 212 (collectively referred to as the "compute units 206-212") such as central processing unit (CPU) cores 206, 208 and graphics processing unit (GPU) cores 210, 212, each capable of concurrently processing different instructions. The processing device 202 is associated with corresponding memory elements, which may be internal to (e.g., implemented on) the processing device 202 or external to the processing device 202 (e.g., system memory 204). For example, the processing device 202 is connected to the external system memory 204.

The processing device 202 also includes one or more levels of cache associated with each of the compute units 206-212. Caches 218, 220, 222, 224 (i.e., CPU caches 218, 220 and GPU caches 222, 224; collectively referred to herein as "the caches 218-224") are used to store (i.e., cache) copies of information stored in the memory 204. Memory transactions are then performed using the cached copy of the information instead of performing the memory transaction directly on the information stored in the memory 204. The blocks used to represent the caches 218-224 may represent a single cache or a plurality of caches such as a cache hierarchy. For example, in one embodiment, the CPU cache 218 may represent a cache hierarchy including multiple cache levels such as an L1 cache, an L2 cache, or an L3 cache. In at least one embodiment, each of the caches 218-224 includes a set of entries, each entry storing an associated unit of data referred to as a cache line.

The processing device 202 executes an operating system (OS) 226. Although a single instance of the OS 226 is shown in FIG. 2, some embodiments of the processing device 202 execute multiple instantiations of the operating system or one or more applications. The processing device 202 also executes an application 228 that generates work in the processing device 202. The processing device 202 further includes a coherence directory 230 to maintain memory coherence among the caches 218-224. Compute units including the CPU cores 206, 208 and the GPU cores 210, 212 access information in the memory 204. Thus, memory transactions occur between the compute units and memory of the processing device 202 or between the compute units and associated caches of different compute units.

In the example of FIG. 2, the CPU cores 206, 208 flush the CPU caches 218, 220 prior to the launch of a GPU kernel. The flushing of the CPU caches 218, 220 triggers according to a plurality of mechanisms in various embodiments. For example, in one embodiment, the OS 226 sends a cache flush command 232 whenever it encounters a GPU kernel call. After flushing the CPU caches 218, 220, the GPU kernel can be launched at one or both of the GPU cores 210, 212. In another embodiment, the application 228 is programmed to send a cache flush command 234 through an application interface (not shown) to the CPU caches before launching a GPU kernel. Flushing of the CPU caches 218, 220 reduces coherence messages associated between the GPU caches 222, 224 and the CPU caches 218, 220. In some embodiments, coherence-related communications for memory access requests from the GPU cores 210, 212 are restricted between GPU cache 222, GPU cache 224, and the coherence directory 230. Such communications are faster than CPU-GPU communications.

As illustrated in FIG. 2, GPU core 210 requests a cache line by accessing the corresponding GPU cache 222. If the requested cache line is not found in the cache 222, the cache forwards the memory access request 236 to the coherence directory 230. Based on information stored at the coherence directory 230, the coherence directory 230 identifies that the CPU caches 218, 220 have been flushed and the requested cache line is not cached in any of the CPU caches 218, 220. At the same time, the coherence directory 230 issues (in response to the memory access request 236) a coherence probe to the GPU cache 224 to determine whether the GPU cache 224 stores the requested cache line and, if so, its corresponding coherence information. If the requested cache line is not cached in the GPU cache 224, the coherence directory 230 fetches the requested cache line from system memory 204 and transfers the cache line to the cache corresponding to the GPU core from which the memory access request 236 originated (i.e., GPU core 210). Additionally, the cache line's corresponding entry is updated in the coherency directory 230.

In the event in which the requested cache line is found in the GPU cache 224, the GPU cache 224 transfers the data to the requester, and the cache line's corresponding entry is updated in the coherence directory 230. For example, in the embodiment illustrated in FIG. 2, GPU cache 224 contains a copy of the requested cache line, and the coherence directory 230 satisfies the memory access request by, in the case of a read operation, providing the requested cache line from the GPU cache 224 to the requesting compute unit (i.e., GPU core 210) or, in the case of a write operation, invalidating the copy in the GPU cache 224, transferring the requested cache line from the GPU cache 224 to the requesting compute unit (i.e., GPU core 210), and storing the write data to the cache line in the GPU cache 222. The cache line's corresponding entry is updated in the coherency directory 230.

Those skilled in the art will recognize that although described in the context of flushing the entirety of CPU caches 218, 220, unnecessary performance penalties arise when flushed cache lines are never used by the GPU kernel. In some alternative embodiments, only a portion of the CPU caches 218, 220 are flushed. For example, certain data structures, local variables used by a particular CPU thread that is isolated from GPU kernels, or certain portions of the cache memory and memory address ranges are designated to be exempt from cache flushing. In some embodiments, this selective flushing mechanism is implemented by designating one bit overhead per cache line to specify whether a cache line will be flushed or not before the launch of a GPU kernel. In this manner, only the cache lines that will be accessed by the GPU kernel will be flushed; CPU-specific or other exempted cache lines will be maintained at the CPU caches 218, 220. This reduces access latencies upon kernel completion, and saves memory bandwidth.

Figure 3:
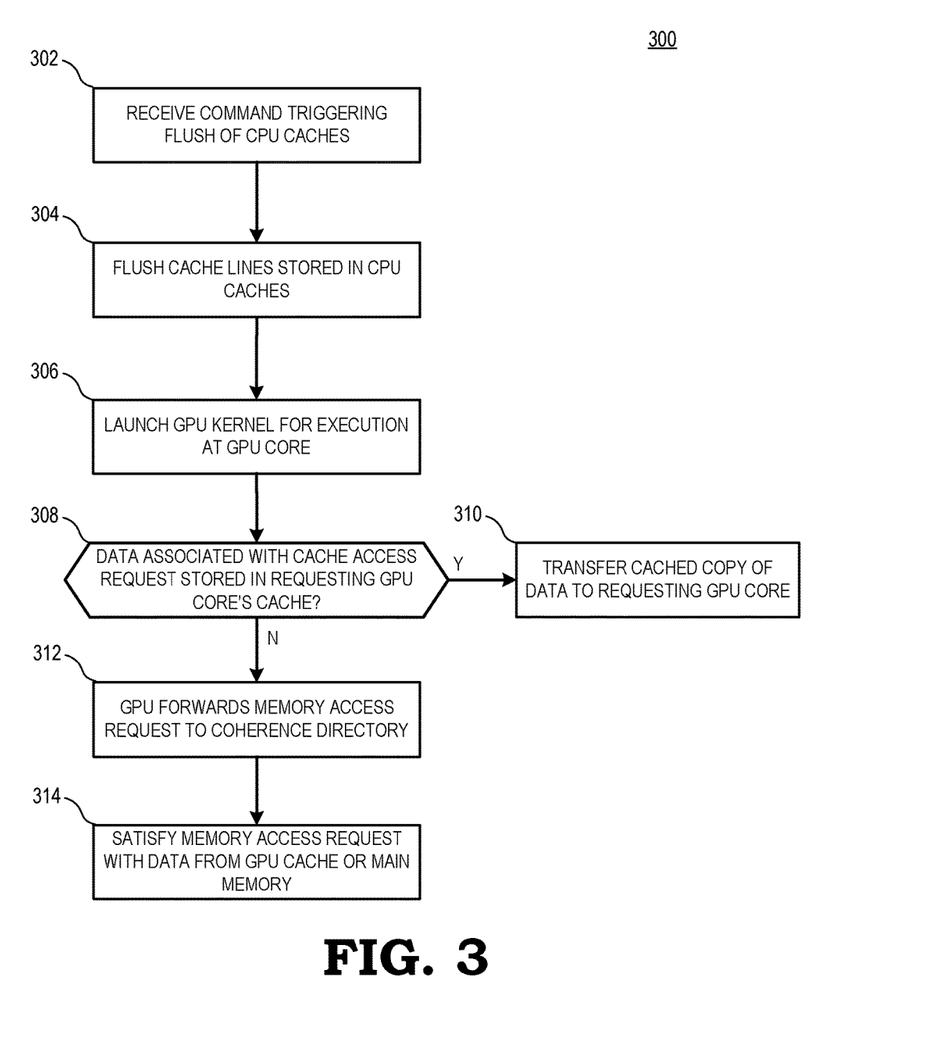
FIG. 3 is a flow diagram of a method for management of cache coherence traffic by flushing CPU caches according to some embodiments.

FIG. 3 is a flow diagram of a method 300 for management of cache coherence traffic by flushing CPU caches according to some embodiments. The method 300 may be implemented in some embodiments of heterogeneous CPU-GPU systems such as the processing device 202 shown in FIG. 2. At block 302, the method 300 begins with one of the CPU cores 206, 208 determining whether a cache flush command is received at the CPU core. As discussed herein, the flushing of the CPU caches 218, 220 triggers according to a plurality of mechanisms in various embodiments. In one embodiment, the cache flush command includes a signal transmitted by the OS 226 when it encounters a GPU kernel call. In another embodiment, the cache flush command includes a signal transmitted by the application 228 through an application interface to the CPU core before launching a GPU kernel.

At block 304, the CPU core that received the cache flush command triggers flushing cache lines stored in CPU caches 218, 220 in response to the received cache flush command. In one embodiment, the operations of block 304 includes flushing all cache lines of CPU caches 218, 220. In some alternative embodiments, only a subset of the CPU caches 218, 220 are flushed at block 304. For example, certain data structures, local variables used by a particular CPU thread that is isolated from GPU kernels, or certain portions of the cache memory and memory address ranges are designated to be exempt from cache flushing. In this manner, only the cache lines that will be accessed by the GPU kernel will be flushed; CPU-specific or other exempted cache lines will be maintained at the CPU caches 218, 220. This reduces access latencies upon kernel completion, and saves memory bandwidth.

At block 306, after flushing of cache lines stored in CPU caches 218, 220, a CPU core (e.g., one of CPU cores 206, 208) launches the GPU kernel for execution at one or more of GPU cores 210, 212. At block 308, during execution of the GPU kernel at one or more of GPU cores 210, 212, one or more of GPU cores 210, 212 issue a cache access request to the cache corresponding to the issuing GPU core. In one embodiment, such as described relative to FIG. 2, the GPU core 210 issues a cache access request to the cache corresponding to that GPU core (i.e., GPU cache 222). If GPU cache 222 contains a cached copy of a requested cache line associated with the cache access request, at block 310, the GPU cache 222 transfers the requested data to the GPU core 210. If GPU cache 222 does not contain a cached copy of a requested cache line (e.g., a cache miss), the method 300 proceeds to block 312.

At block 312, the GPU cache forwards a memory access request to a coherence directory. In one embodiment, such as described relative to FIG. 2, GPU core 210 issues a cache line request to GPU cache 222 and the request misses in the GPU cache 222, which then forwards the memory access request 236 to the coherence directory 230. Based on information stored at the coherence directory 230, the coherence directory 230 knows that the CPU caches 218, 220 have been flushed and the requested cache line is not cached in any of the CPU caches 218, 220. Accordingly, in response to the memory access request 236, the coherence directory 230 issues a coherence probe to the other GPU cache 224 to determine whether any of the other GPU caches (except for the cache corresponding to the requesting GPU core 210) store the cache line and, if so, its corresponding coherence information.

At block 314, the memory access request is satisfied from GPU cache or main memory. In one embodiment, such as described relative to FIG. 2, in the event in which the requested cache line is not cached in any of the GPU caches 224, 224, the coherence directory 230 fetches the requested cache line from system memory 204 and transfers the cache line to the cache corresponding to the GPU core from which the memory access request 236 originated (i.e., GPU core 210). At the same time, the cache line's corresponding entry is updated in the coherence directory 230. In the event in which the requested cache line is found in the other GPU cache 224, the cache transfers the data to the cache corresponding to the requesting GPU core (i.e., GPU cache 222), and the cache line's corresponding entry is updated in the coherence directory 230. For example, GPU cache 224 contains a copy of the requested cache line, and the coherence directory 230 satisfies the memory access request by, in the case of a read operation, providing the requested cache line from the GPU cache 224 to the requesting compute unit (i.e., GPU core 210). In the case of a write operation, storing the write data to the cache entry.

GPU operations are typically memory intensive and each memory transaction initiated by a GPU core requires transmitting coherence messages to maintain cache coherency. Thus, memory transactions and their associated coherence messages limit system performance by consuming available communications bandwidth. For example, if the coherence traffic is between many-to-one (e.g., many GPU cores send coherence traffic to the same CPU core), the communication fabric is congested due to lack of bandwidth, and many of these coherence messages will have to stall to traverse through the communication fabric. Therefore, accessing data from nearby GPU caches (and also retrieving directly from main memory) is faster than transmitting and waiting on CPU-GPU coherence communications.

Figure 4:
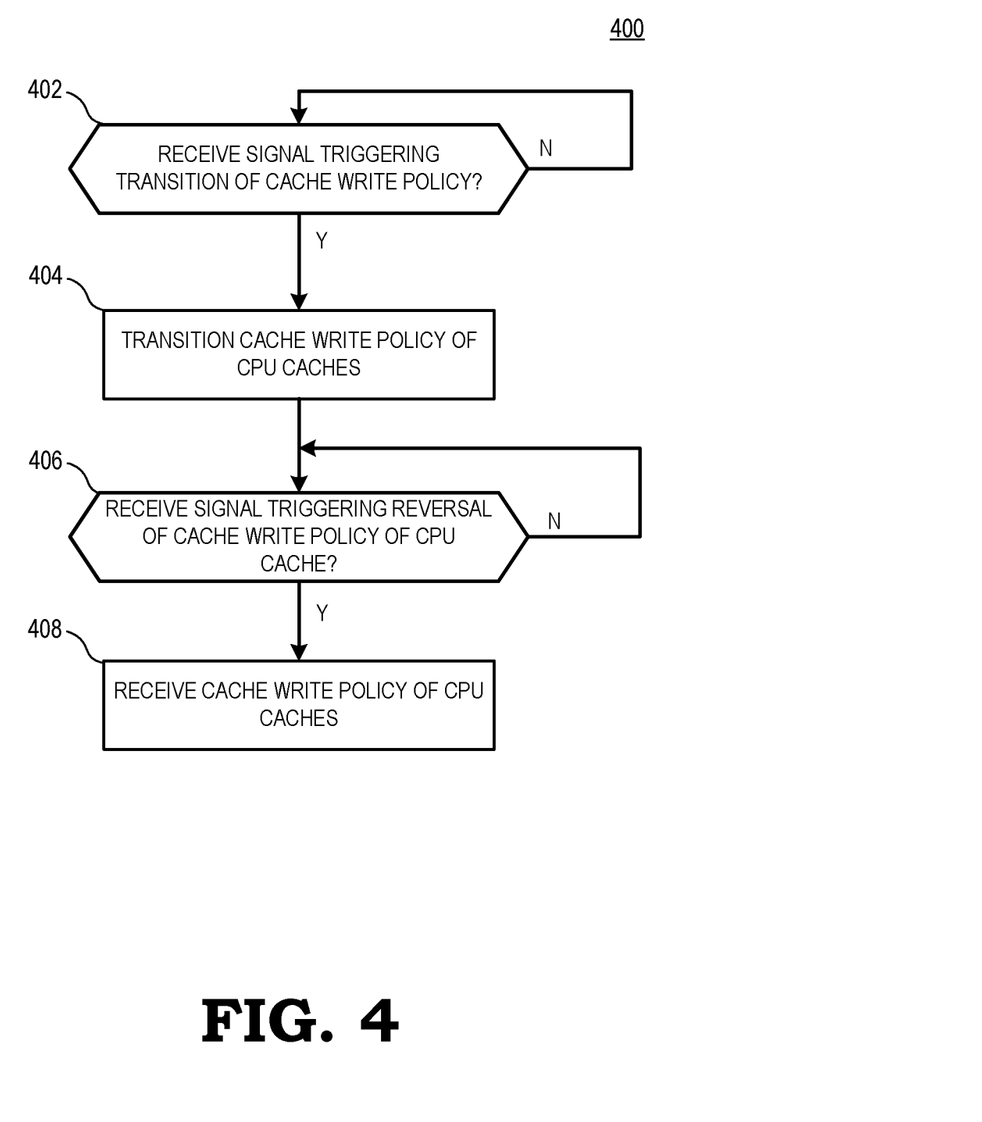
FIG. 4 is a flow diagram of a method for changing cache write policy for coherence traffic management in accordance with some embodiments.

FIG. 4 is a flow diagram of a method 400 for changing cache write policy for coherence traffic management in accordance with some embodiments. The method 400 may be implemented in some embodiments of heterogeneous CPU-GPU systems such as the processing device 102 shown in FIG. 1. At block 402, one of the CPU cores 106, 108, 110 determines whether a cache write policy signal is received at the CPU core that triggers a transition of cache write policies. The transition of cache write policies triggers when a workload running at the CPU core(s) is about to complete its execution at the CPU core(s) and be handed off to one or more of the GPU cores 112, 114 for execution. In various embodiments, the timing to switch write policies is user- or application-driven through the use of application program interfaces (APIs) or directive pragmas that specify behavior change in preparation of an upcoming GPU kernel launch. For example, the triggering of the transition of write policies can be accomplished via various mechanisms including but not limited to: a special/new instruction, writing to a specific register, writing to a special memory location monitored by the CPU core, etc. If the cache write policy signal is not received at block 402, the CPU core (e.g., one or more of the CPU cores 106, 108, 110 of FIG. 1) maintains its current cache write policy until the signal is received.

In some embodiments, receiving the cache write policy signal does not necessarily trigger an immediate change in cache write policy. Rather, the signal alerts the CPU core of an impending GPU kernel launch and allows the CPU core to schedule a change in cache write policies at a future point in time that is more computationally efficient (e.g., after currently outstanding memory requests have completed). Those skilled in the art will recognize that this delay in changing cache write policy does not affect the correctness of cached data and does not lead to incoherent copies of data. The delaying of the change in cache write policy would only potentially miss the preemptive flushing of some cache lines, which may result in additional GPU-CPU coherence traffic that might have otherwise been avoided if the cache write policy was changed immediately. Accordingly, the exact timing of the transition in cache write policy is not critical and persons skilled in the art having benefit of the present disclosure should appreciate that the transition timing is a matter of design choice that may take into account, for example, performance considerations of currently executing application threads at the CPU core.

CPU caches typically utilize a write-back policy in which when a CPU core writes data to a CPU cache, the writing is initially performed only to the accessed CPU cache and the writing of the modified cache line to the lower-level caches (e.g., L2 cache) and the main memory (e.g., system memory 104 of FIG. 1) is postponed until the written cache line is evicted from the cache in which the writing is initially performed. At block 404, the CPU core(s) transitions the cache write policy of its caches (e.g., CPU caches 126, 128, 130 of FIG. 1) in response to the cache write policy signal. In one embodiment, transitioning the cache write policy of the CPU caches includes switching a write policy from write-back to write through, in which writes are synchronously performed both to all CPU caches corresponding to the write requesting CPU core and to the main memory.

In various embodiments, one or more of the CPU cores 106, 108, 110 cache data in CPU caches 126, 128, 130 while executing an application. When a serial portion of the application completes its execution at the CPU cores 106, 108, 110, the application is offloaded to one or more of the GPU cores 112, 114 for parallel execution. Before the GPU kernel is launched, the CPU cores 106, 108, 110 may have cached data that will later be used by the GPU kernel. Switching a write policy from write-back to write through results in any writes to cache lines in the CPU caches to be directly propagated to the main memory, thereby potentially reducing coherence traffic between the GPU cores 112, 114 and CPU cores 106, 108, 110. Although a write-through policy has a disadvantage of consuming more memory bandwidth (relative to write-back policy) between CPU caches and main memory, this extra bandwidth demand is small relative to the otherwise incurred bandwidth demand between the GPU caches and the CPU caches. Switching to a write-through policy allows the CPU caches to hold clean data during execution of GPU kernels, and fast access to cache lines for read purposes without having to probe CPU caches to get the most up-to-date copies of the requested data from the CPU caches.

In some embodiments, transitioning the cache write policy of the CPU caches further includes switching a write allocate policy of the CPU caches from write-allocate (e.g., data at a missed-write location is loaded to CPU cache and followed by a write-hit operation) to no-write-allocate, in which data at the missed-write location is not loaded to CPU cache, and is instead written directly to the main memory. In some embodiments, if a lower-level cache already stores the requested cache line, the write is performed in that lower-level cache for no-write-allocate policies. However, if another CPU core's private cache already stores the requested cache line, that cache line is invalidated and the write is performed either in a shared, lower-level cache or in the main memory. Switching a write miss policy to no-write-allocate results in write misses that will not cause the cache line to be brought back to the CPU cache, thereby preventing GPU requests from frequently sending coherence messages to CPU caches. In some embodiments, both write policy (i.e., write-through vs. write back) and write allocate policy (i.e., write allocate and no-write-allocate) are transitioned together at the same time.

To reduce the overhead of the write-through policy, switching to write through is triggered when the CPU core begins preparing data for GPU kernels, and the write-back policy is re-initiated before the CPU core restarts its computation. Accordingly, at block 406, a reverse signal is received after execution of the GPU kernel that triggers a reversal of the cache write policy transition performed in block 404, thereby returning the CPU caches 126, 128, 130 to their initial cache write policies at block 408.

Those skilled in the art will recognize that coherence messages between memory-intensive GPU caches to CPU caches can often lead to an imbalanced, many-to-few type of traffic. This would cause the network activity to be congested near the CPU core, leading to performance losses. Further, as CPU-GPU communication latency increases, the performance penalty associated with CPU-GPU coherence activity also increases. For example, performance losses may be experienced in systems with CPU and GPU cores organized to be on different dies connected through interposers or multi-chip modules (MCMs). By reducing the frequency of CPU-GPU coherence communication as described herein, the average interconnect traversal distance of memory accesses by GPU cores is reduced. This improves overall system performance by lowering latency, reducing total network traffic, and lowering contention for cache lines.

In some embodiments, the techniques and apparatus described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, those skilled in the art appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
receiving, at a processing system including at least a central processing unit (CPU) core and a graphics processing unit (GPU) core, a cache write policy signal from an application executing at the CPU core in the processing system;
changing, in response to the cache write policy signal, a cache write policy for a cache of the CPU core from a write-back policy for cache hits to a write-through policy before execution of a task at the GPU core, wherein the cache write policy controls caching of written data in the processing system; and
propagating, based on the write-through policy, write hits to cache lines of the cache of the CPU core to a memory at a different level of a memory hierarchy.

2. The method of claim 1, further comprising:
changing the cache write policy for the cache from the write-through policy to the write-back policy in response to the task finishing execution at the GPU core.

3. The method of claim 1, wherein receiving the cache write policy signal comprises receiving the cache write policy signal at the CPU core prior to launching the task for execution at the GPU core.

4. The method of claim 3, further comprising:
monitoring an application running at the processing system to identify an upcoming launch of the task, wherein the task comprises execution of a workload by a GPU kernel.

5. The method of claim 1, wherein changing the cache write policy comprises delaying the changing of the cache write policy until after launching the task for execution at the GPU core until completion of memory requests executing at the CPU core.

6. The method of claim 1, further comprising:
changing, in response to the cache write policy signal, a cache miss policy for the cache of the CPU core from a write-allocate policy for cache misses to a no-write-allocate policy before execution of the task at the GPU core.

7. A method, comprising:
receiving, at a processing system including at least a first processing unit core and a second processing unit core, a cache flush command from an application executing at the first processing unit core in the processing system prior to launching a task to the second processing unit core;
flushing, in response to the cache flush command, cache lines stored in caches of the first processing unit core; and
transferring data associated with a memory access request by the second processing unit core while suppressing, based on flushing of cache lines stored in caches of the first processing unit core, issuance of coherence probes to caches of the first processing unit core during execution of the task by the second processing unit core.

8. The method of claim 7, further comprising:
receiving, at a coherence directory of the processing system, the memory access request from the second processing unit core.

9. The method of claim 7, further comprising:
delaying the flushing of cache lines stored in caches until after launching the task until completion of memory requests executing at the first processing unit core.

10. The method of claim 7, wherein:
flushing cache lines comprises flushing cache lines stored in caches of the first processing unit core prior to launching the task; and
the task comprises execution of a workload by a GPU kernel.

11. The method of claim 7, wherein flushing cache lines comprises flushing a subset of cache lines stored in caches of the first processing unit core.

12. The method of claim 7, further comprising:
designating cache lines storing a particular data structure or a particular variable not used by the second processing unit core to be exempt from cache flushing; and
omitting the designated cache lines from flushing in response to the cache flush command.

13. The method of claim 7, further comprising:
designating a range of memory addresses in caches of the first processing unit core to be exempt from cache flushing; and
omitting the designated range of memory addresses from flushing in response to the cache flush command.

14. A system, comprising:
a processing device including a first processing unit core and a second processing unit core, wherein the first processing unit core receives a flush command to flush cache lines stored in caches of the first processing unit core prior to launching a task to the second processing unit core; and
a coherence directory for maintaining cache coherence, wherein the coherence directory transfers data associated with a memory access request by the second processing unit core without issuing, based on flushing of cache lines stored in caches of the first processing unit core, coherence probes to caches of the first processing unit core during execution of the task by the second processing unit core.

15. The system of claim 14, wherein:
the cache flush command is received from an operating system or an application executing at the processing device upon encountering a call to launch the task; and
the task comprises execution of a workload by a GPU kernel.

16. The system of claim 14, wherein the first processing unit core flushes cache lines stored in caches of the first processing unit core prior to launching the task.

17. The system of claim 14, wherein the flushing of cache lines is delayed until after launching the task until completion of memory requests executing at the first processing unit core.

18. The system of claim 17, wherein the first processing unit core flushes a subset of cache lines stored in caches of the first processing unit core.

19. The system of claim 17, wherein:
a subset of cache lines stored in caches of the first processing unit core contain a particular data structure or a particular variable not used by the at second processing unit core; and
the subset of cache lines are designated to be exempt from cache flushing.

* * * * *

UNITED STATES PATENT AND TRADEMARK OFFICE
CERTIFICATE OF CORRECTION

PATENT NO. : 10,303,602 B2
APPLICATION NO. : 15/475435
DATED : May 28, 2019
INVENTOR(S) : Onur Kayiran et al.

It is certified that error appears in the above-identified patent and that said Letters Patent is hereby corrected as shown below:

In the Claims

Column 15, Claim 19, Line 4, please delete "used by the at second" and insert --used by the second--.

Signed and Sealed this
Twenty-fourth Day of March, 2020

Andrei Iancu
*Director of the United States Patent and Trademark Office*